US011455198B1

(12) United States Patent
Singh

(10) Patent No.: US 11,455,198 B1
(45) Date of Patent: Sep. 27, 2022

(54) ELECTRONIC SYSTEM FOR DYNAMICALLY ORCHESTRATING APPLICATION PROGRAMMING INTERFACE CALLS USING QUANTUM COMPUTING

(71) Applicant: BANK OF AMERICA CORPORATION, Charlotte, NC (US)

(72) Inventor: Shailendra Singh, Maharashtra (IN)

(73) Assignee: BANK OF AMERICA CORPORATION, Charlotte, NC (US)

(*) Notice: Subject to any disclaimer, the term of this patent is extended or adjusted under 35 U.S.C. 154(b) by 0 days.

(21) Appl. No.: 17/358,247

(22) Filed: Jun. 25, 2021

(51) Int. Cl.
*G06F 9/54* (2006.01)
*G06N 20/20* (2019.01)
*G06N 10/00* (2022.01)

(52) U.S. Cl.
CPC ............. *G06F 9/541* (2013.01); *G06N 10/00* (2019.01); *G06N 20/20* (2019.01)

(58) Field of Classification Search
CPC ...................................................... G06F 9/541
USPC ........................................................ 719/328
See application file for complete search history.

(56) References Cited

U.S. PATENT DOCUMENTS 10,484,479 B2* 11/2019 Johnson ................. H04L 67/125
2021/0406711 A1* 12/2021 Ang ......................... G06F 9/547

* cited by examiner

*Primary Examiner* — Andy Ho
(74) *Attorney, Agent, or Firm* — Moore & Van Allen PLLC; R. W. McCord Rayburn

(57) ABSTRACT

Systems, computer program products, and methods are described herein for dynamically orchestrating API calls using quantum computing. The present invention may be configured to receive API calls from clients, determine whether each API call is acceptable using a first machine learning model, and determine whether a subset or multiple subsets of the acceptable API calls are combinable using a second machine learning model to obtain API call categories. The present invention may be configured to determine whether to route each API call category to a cache or to an endpoint using a third machine learning model and obtain data from the endpoint that includes responses of the endpoint. In some embodiments, the first machine learning model, the second machine learning model, and the third machine learning model may be trained using one or more quantum computing engines.

20 Claims, 10 Drawing Sheets

ELECTRONIC SYSTEM FOR DYNAMICALLY ORCHESTRATING APPLICATION PROGRAMMING INTERFACE CALLS USING QUANTUM COMPUTING

FIELD OF THE INVENTION

The present invention embraces an electronic system for dynamically orchestrating application programming interface (API) calls using quantum computing.

BACKGROUND

An API is a computing interface that defines interactions between software intermediaries. An API may define the types of calls and/or requests that may be made, how to make the calls and/or requests, data formats that may be used, conventions to follow, and/or the like.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for dynamically orchestrating API calls using quantum computing. The system may include at least one non-transitory storage device and at least one processing device coupled to the at least one non-transitory storage device, where the at least one processing device may be configured to receive API calls from clients and determine, using a first machine learning model, whether each API call of the API calls is acceptable to obtain acceptable API calls, where the first machine learning model is trained using a first quantum computing engine. The at least one processing device may be configured to determine, using a second machine learning model, whether each acceptable API call of the acceptable API calls is combinable with another acceptable API call of the acceptable API calls to obtain API call categories, where each API call category of the API call categories includes combinable API calls, and where the second machine learning model is trained using a second quantum computing engine. The at least one processing device may be configured to determine, using a third machine learning model, whether to route each API call category of the API call categories to a cache or to an endpoint, where the third machine learning model is trained using a third quantum computing engine. The at least one processing device may be configured to obtain, based on determining to route an API call category of the API call categories to the cache, data from the endpoint, where the data includes responses of the endpoint to the acceptable API calls of the API call category. The at least one processing device may be configured to determine, based on determining to route the API call category to the cache and using a fourth machine learning model, a time-to-live for maintaining the data in the cache for the API call category, where the fourth machine learning model is trained using a fourth quantum computing engine. The at least one processing device may be configured to provide, based on the data in the cache, responses to the acceptable API calls of the API call category.

In some embodiments, the at least one processing device may be configured to monitor the received API calls and the responses to the acceptable API calls to generate traffic data. Additionally, or alternatively, the at least one processing device may be configured to train at least one of the first machine learning model, the second machine learning model, the third machine learning model, or the fourth machine learning model based on the traffic data.

In some embodiments, the at least one processing device may be configured to, when determining whether each API call of the API calls is acceptable, process, using a natural language processing engine, each API call of the API calls to obtain contextual information associated with each API call and determine, using the first machine learning model and based on the contextual information, whether each API call of the API calls is acceptable. Additionally, or alternatively, the contextual information may include, for each API call, a call volume associated with a client requesting the API call, a type of the API call, an internet protocol address associated with the API call, a geographic location associated with the API call, a property of a device transmitting the API call, and/or the like.

In some embodiments, the at least one processing device may be configured to, when determining whether each API call of the API calls is acceptable, determine, based on filter rules generated by the first machine learning model, whether each API call of the API calls is acceptable.

In some embodiments, the at least one processing device may be configured to, when determining whether each acceptable API call of the acceptable API calls is combinable with another acceptable API call of the acceptable API calls, determine, based on combination rules generated by the second machine learning model, whether each acceptable API call of the acceptable API calls is combinable with another acceptable API call of the acceptable API calls.

In some embodiments, the at least one processing device may be configured to, when determining whether to route each API call category of the API call categories to the cache or to the endpoint, determine, based on cache rules generated by the third machine learning model, whether to route each API call category of the API call categories to the cache or to the endpoint.

In some embodiments, the at least one processing device may be configured to provide, based on determining to route another API call category, of the API call categories, to the endpoint, a set of acceptable API calls of the other API call category to the endpoint. Additionally, or alternatively, the at least one processing device may be configured to determine to route the other API call category to the endpoint based on determining that the other API call category includes API calls requesting dynamic data.

In some embodiments, the at least one processing device may be configured to maintain the data in the cache for the time-to-live.

In some embodiments, the at least one processing device may be configured to determine whether the time-to-live has expired, determine whether the data in the cache is being used, and delete, based on determining that the time-to-live has expired and based on determining that the data in the cache is not being used, the data from the cache In some embodiments, the endpoint may include one or more servers hosting at least one of systems or data structures.

In some embodiments, the first quantum computing engine, the second quantum computing engine, and/or the third quantum computing engine are configured to train the first machine learning model, the second machine learning model, and/or the third machine learning model, respectively, to reduce a volume of API calls routed to the endpoint.

In another aspect, the present invention embraces a computer program product for dynamically orchestrating API calls using quantum computing. The computer program product may include a non-transitory computer-readable medium including code causing a first apparatus to receive API calls from clients and determine, using a first machine learning model, whether each API call of the API calls is acceptable to obtain acceptable API calls, where the first machine learning model is trained using a first quantum computing engine. The computer program product may include a non-transitory computer-readable medium including code causing the first apparatus to determine, using a second machine learning model, whether each acceptable API call of the acceptable API calls is combinable with another acceptable API call of the acceptable API calls to obtain API call categories, where each API call category of the API call categories includes combinable API calls, and where the second machine learning model is trained using a second quantum computing engine. The computer program product may include a non-transitory computer-readable medium including code causing the first apparatus to determine, using a third machine learning model, whether to route each API call category of the API call categories to a cache or to an endpoint, where the third machine learning model is trained using a third quantum computing engine. The computer program product may include a non-transitory computer-readable medium including code causing the first apparatus to obtain, based on determining to route an API call category of the API call categories to the cache, data from the endpoint, where the data includes responses of the endpoint to the acceptable API calls of the API call category. The computer program product may include a non-transitory computer-readable medium including code causing the first apparatus to determine, based on determining to route the API call category to the cache and using a fourth machine learning model, a time-to-live for maintaining the data in the cache for the API call category, where the fourth machine learning model is trained using a fourth quantum computing engine. The computer program product may include a non-transitory computer-readable medium including code causing the first apparatus to provide, based on the data in the cache, responses to the acceptable API calls of the API call category.

In some embodiments, the non-transitory computer-readable medium may include code causing the first apparatus to monitor the received API calls and the responses to the acceptable API calls to generate traffic data. Additionally, or alternatively, the non-transitory computer-readable medium may include code causing the first apparatus to train at least one of the first machine learning model, the second machine learning model, the third machine learning model, or the fourth machine learning model based on the traffic data.

In some embodiments, the non-transitory computer-readable medium may include code causing the first apparatus to, when determining whether each API call of the API calls is acceptable, process, using a natural language processing engine, each API call of the API calls to obtain contextual information associated with each API call, and determine, using the first machine learning model and based on the contextual information, whether each API call of the API calls is acceptable. Additionally, or alternatively, the contextual information may include, for each API call, a call volume associated with a client requesting the API call, a type of the API call, an internet protocol address associated with the API call, a geographic location associated with the API call, a property of a device transmitting the API call, and/or the like.

In yet another aspect, a method for dynamically orchestrating API calls using quantum computing is presented. The method may include receiving API calls from clients and determining, using a first machine learning model, whether each API call of the API calls is acceptable to obtain acceptable API calls, where the first machine learning model is trained using a first quantum computing engine. The method may include determining, using a second machine learning model, whether each acceptable API call of the acceptable API calls is combinable with another acceptable API call of the acceptable API calls to obtain API call categories, where each API call category of the API call categories includes combinable API calls, and where the second machine learning model is trained using a second quantum computing engine. The method may include determining, using a third machine learning model, whether to route each API call category of the API call categories to a cache or to an endpoint, where the third machine learning model is trained using a third quantum computing engine. The method may include obtaining, based on determining to route an API call category of the API call categories to the cache, data from the endpoint, where the data includes responses of the endpoint to the acceptable API calls of the API call category. The method may include determining, based on determining to route the API call category to the cache and using a fourth machine learning model, a time-to-live for maintaining the data in the cache for the API call category, where the fourth machine learning model is trained using a fourth quantum computing engine. The method may include providing, based on the data in the cache, responses to the acceptable API calls of the API call category.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
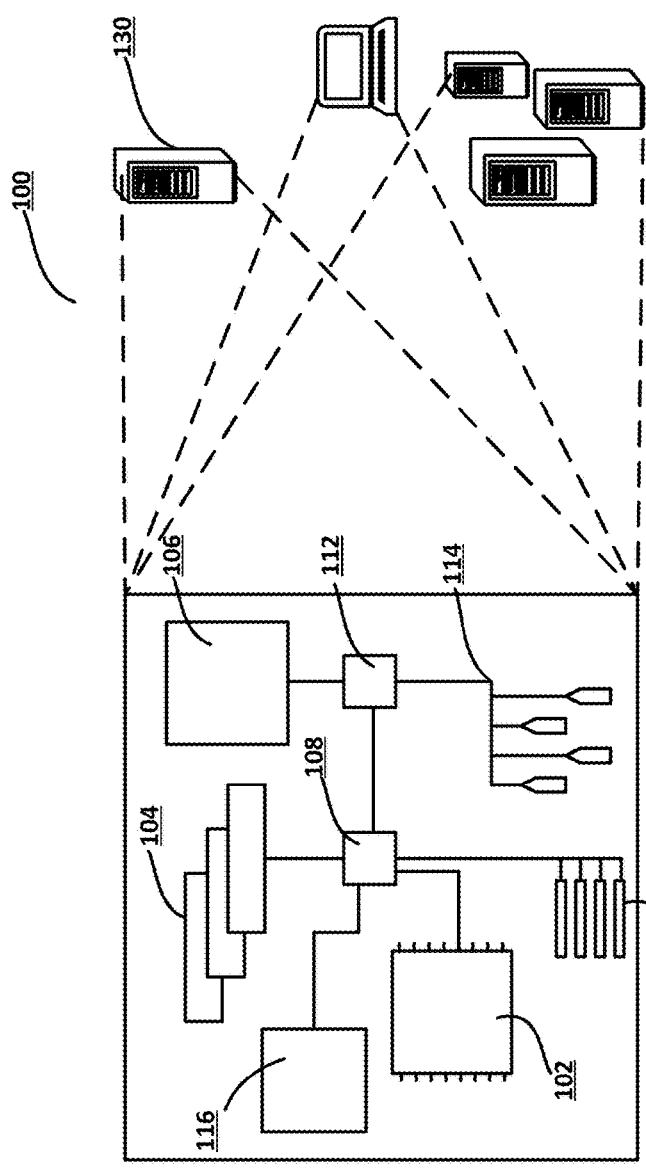
Figure 1:
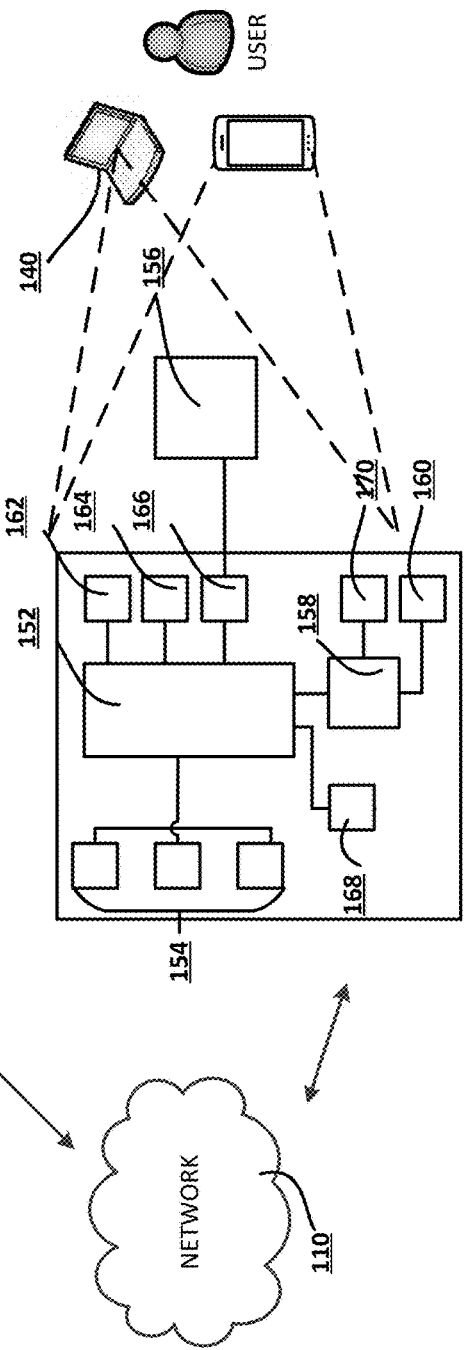
Figure 2:
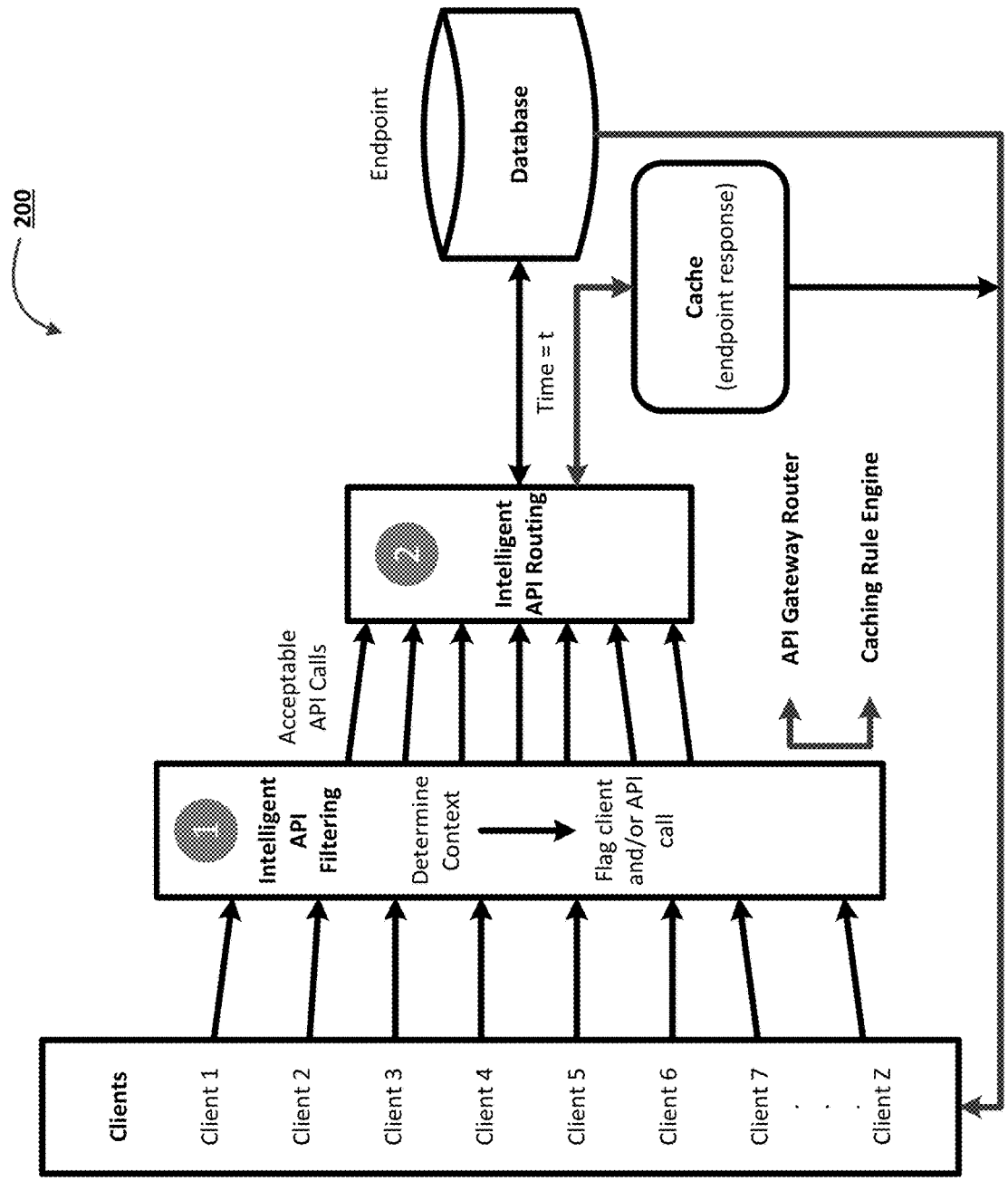
Figure 3:
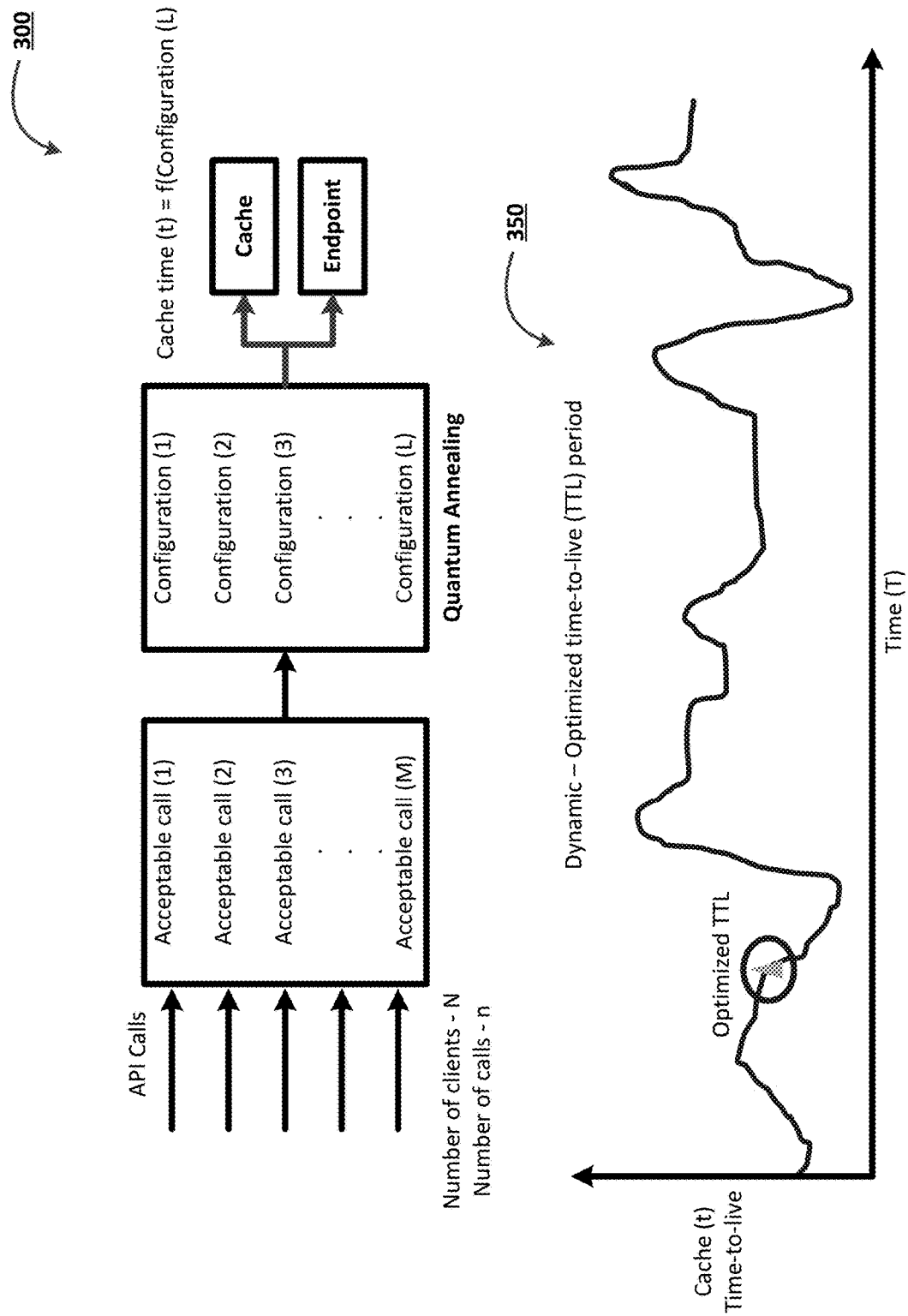
Figure 4:
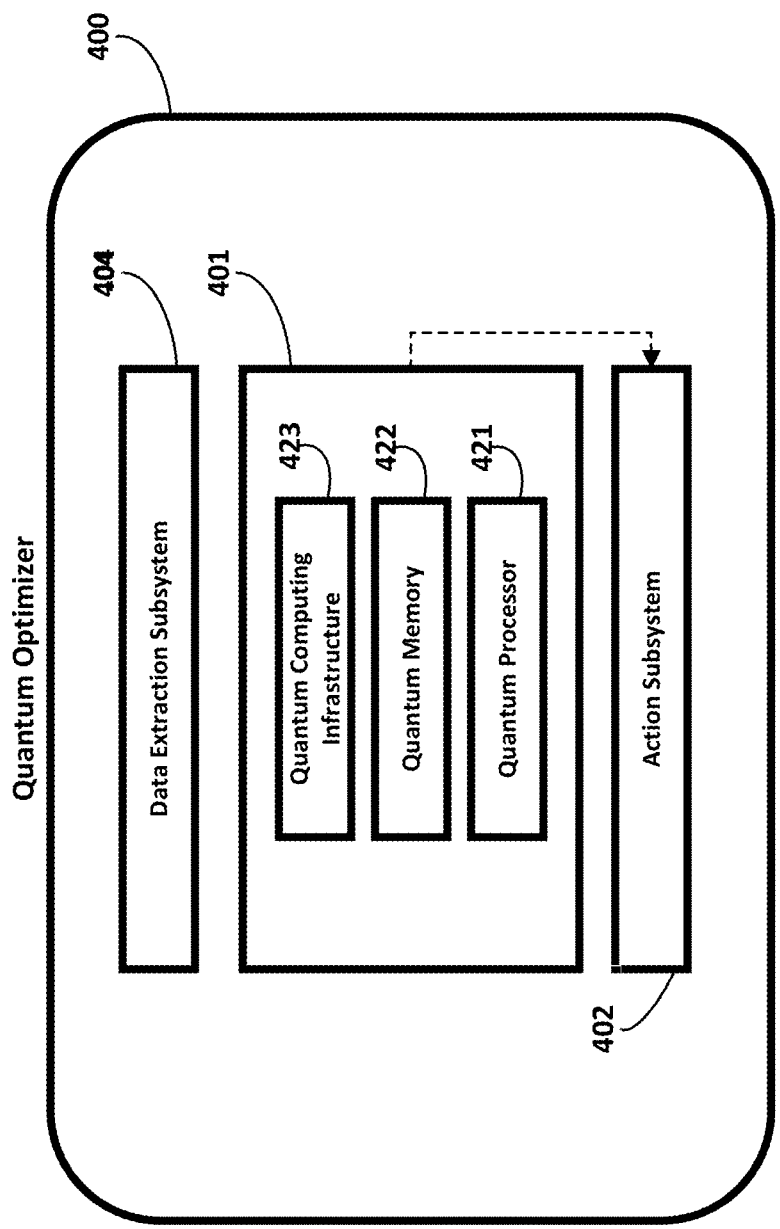
Figure 5:
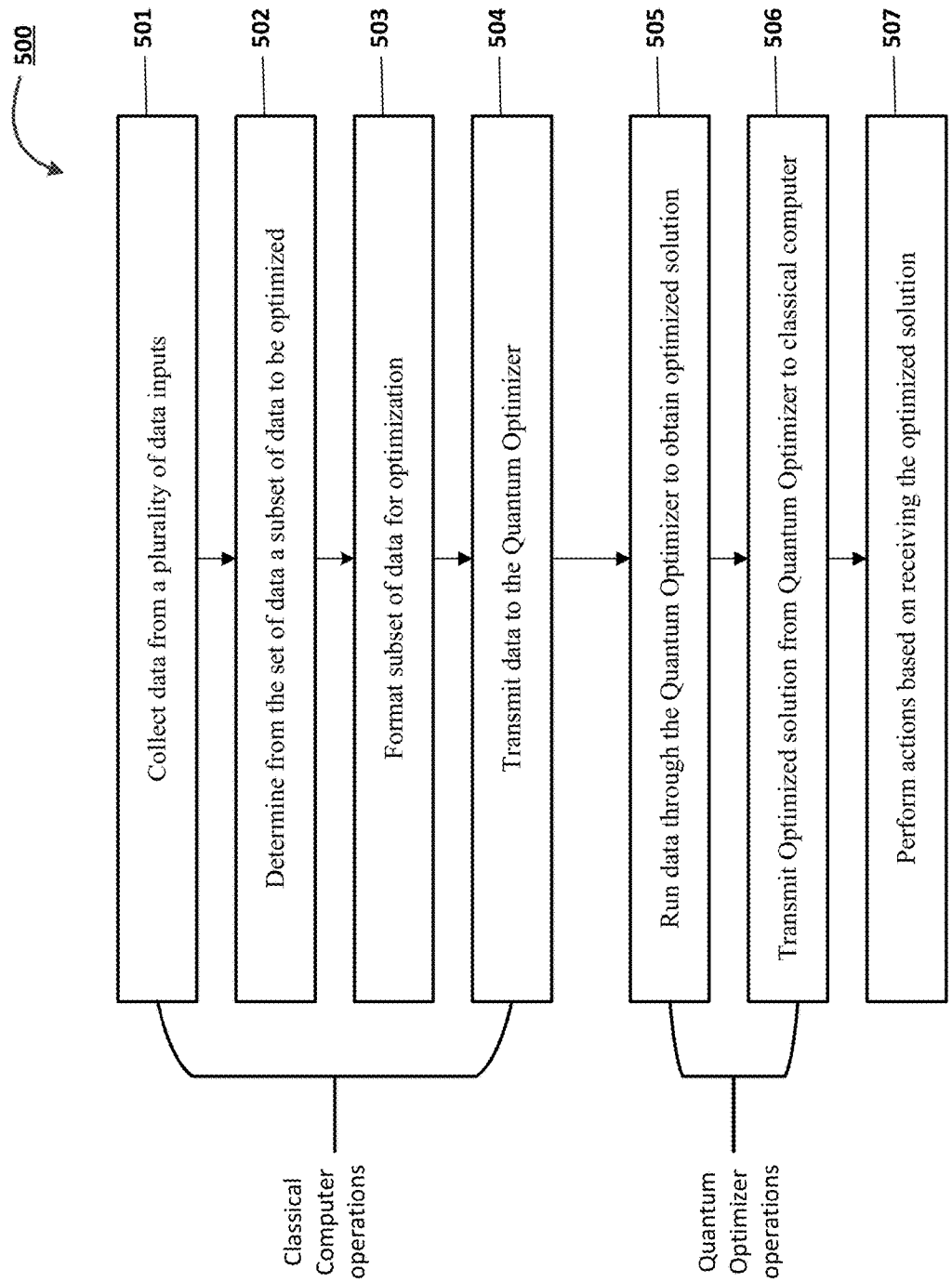
Figure 6:
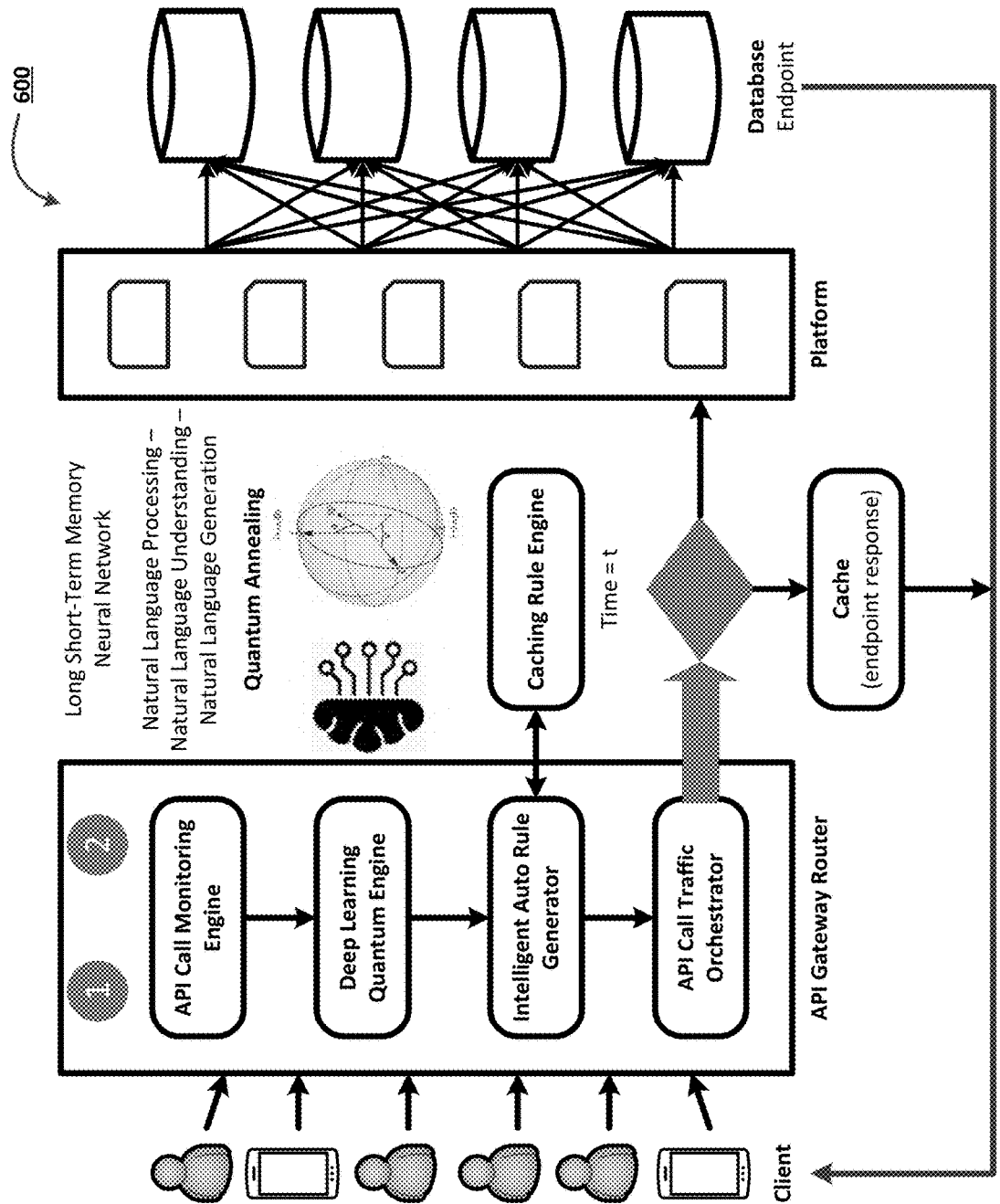
Figure 7:
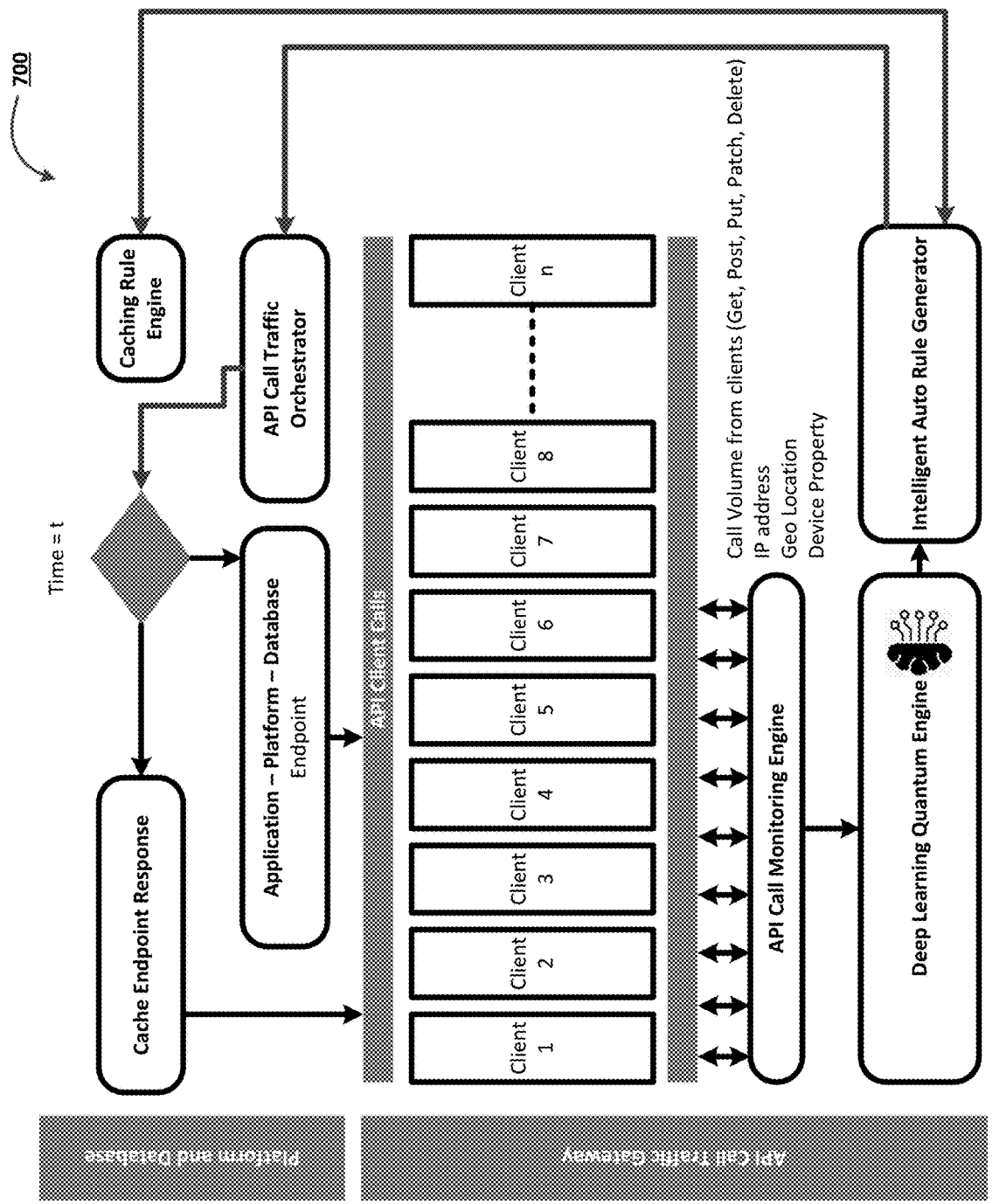
Figure 8:
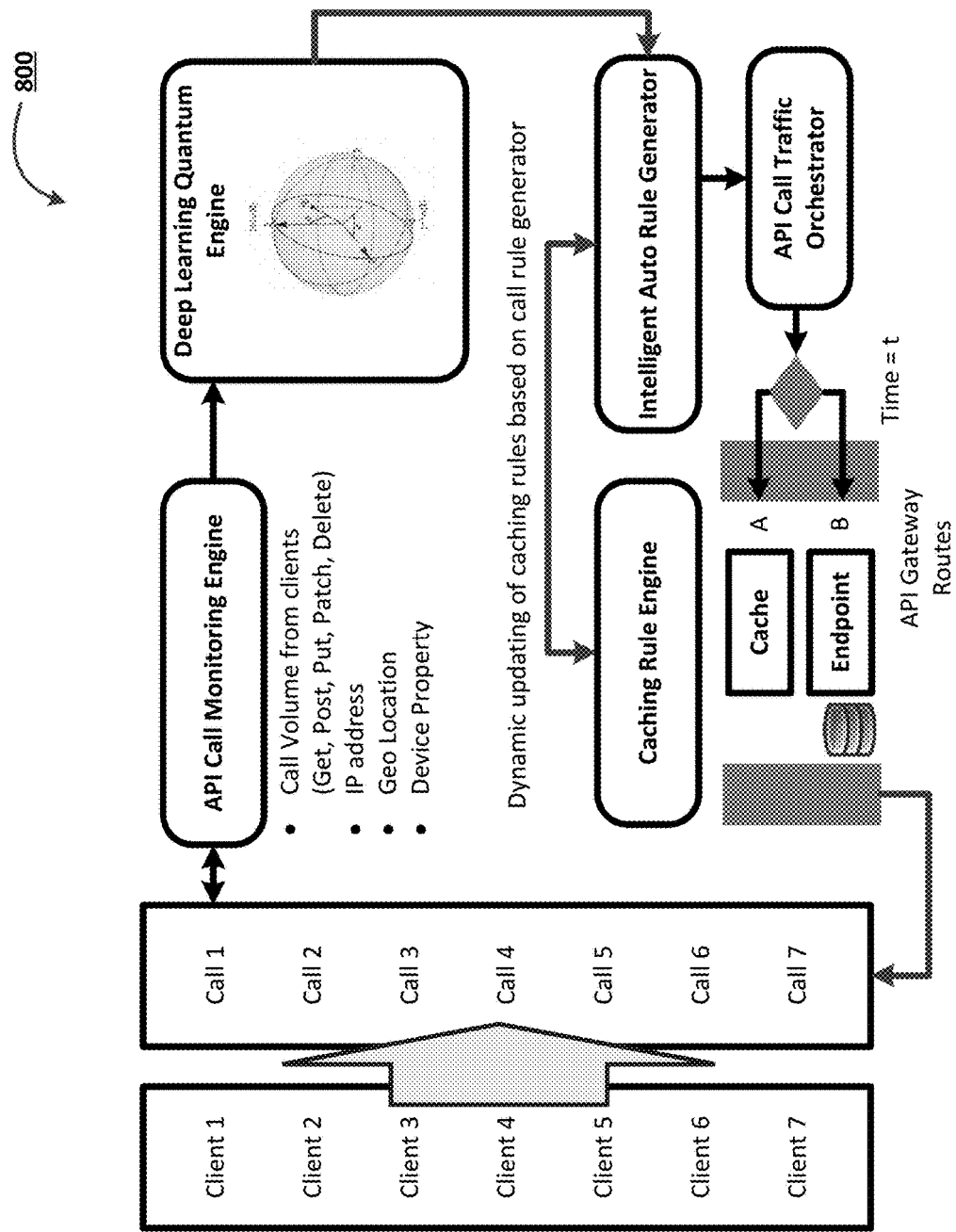
Figure 9:
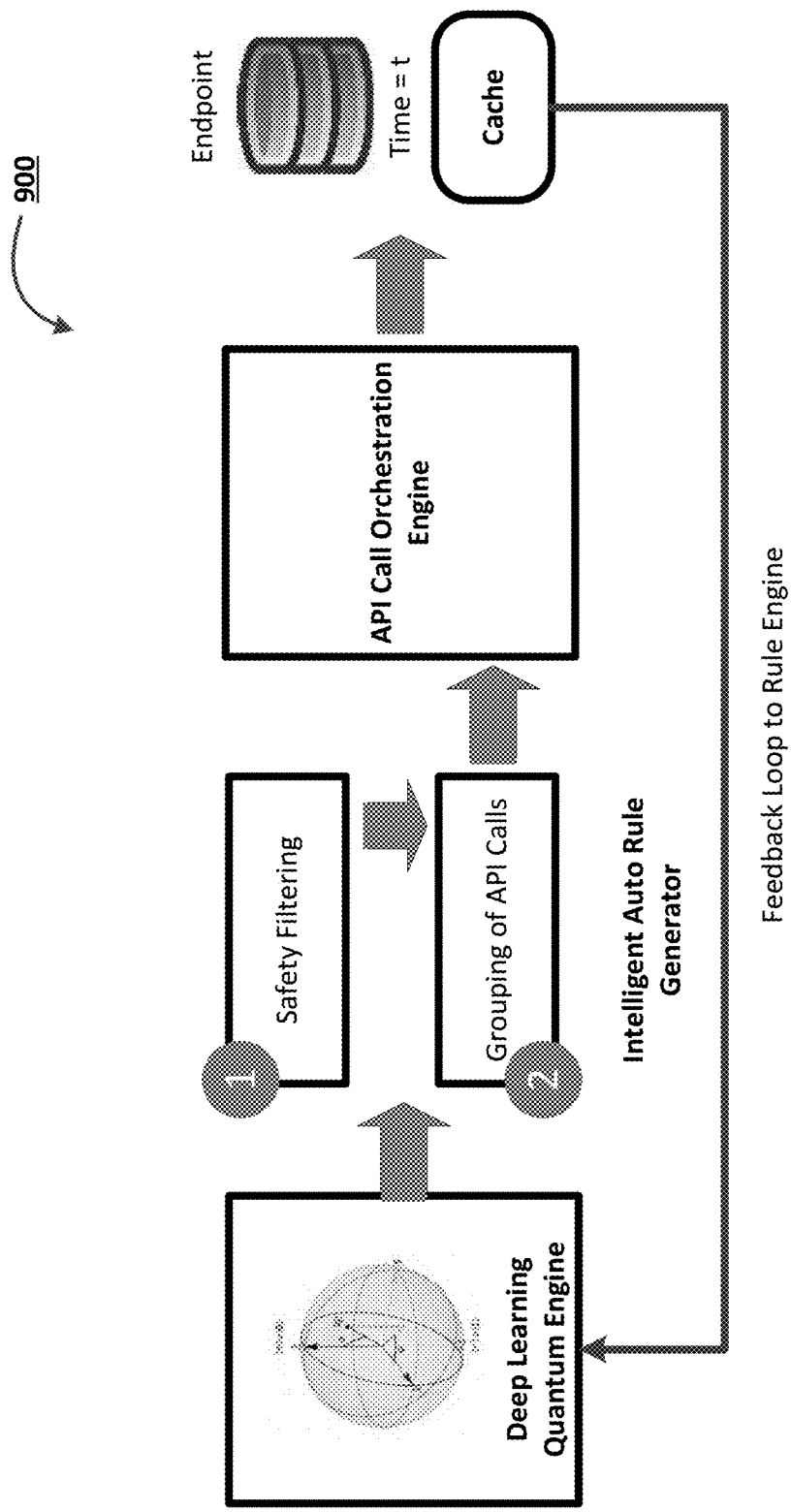
Figure 10:
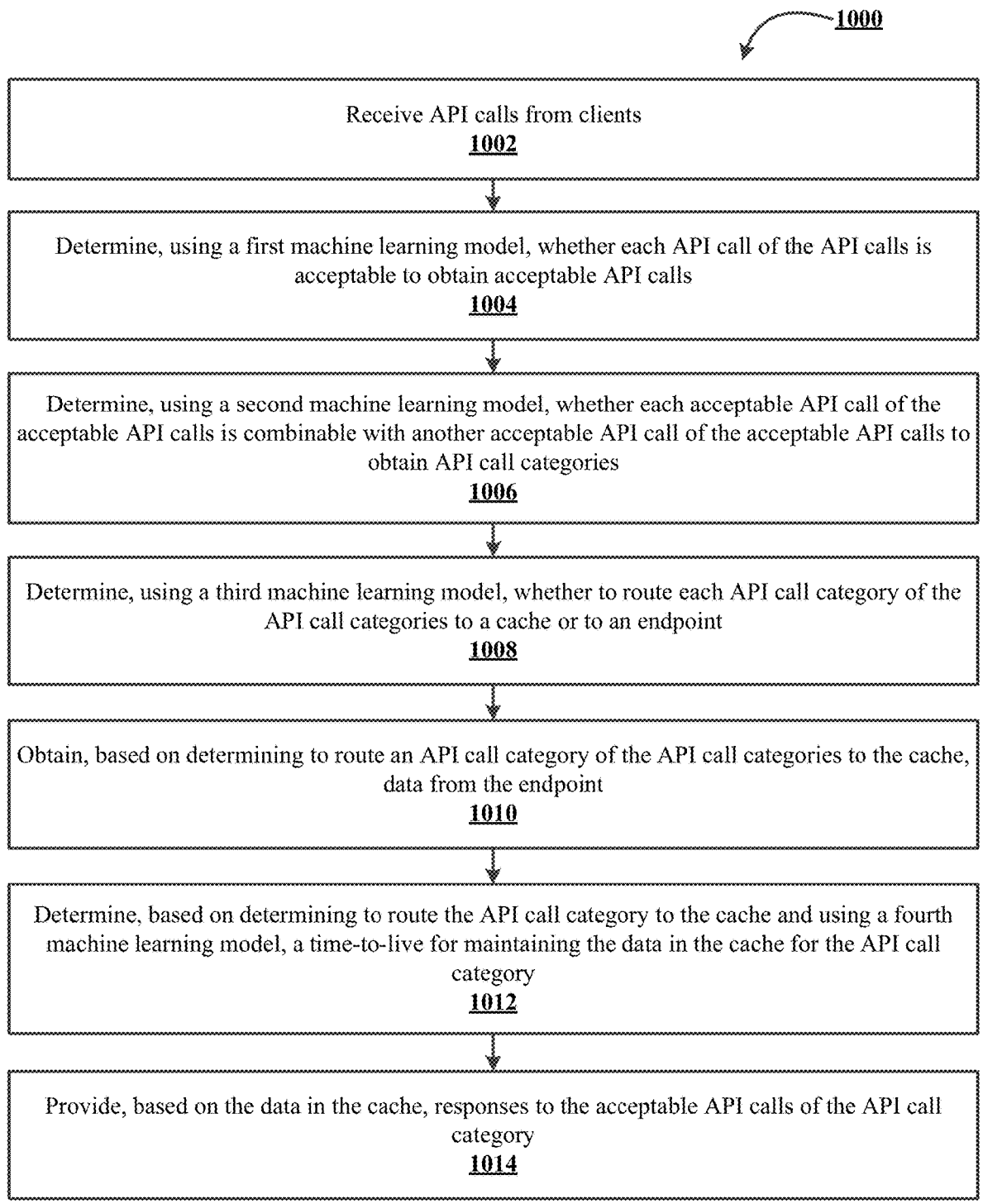

Having thus described embodiments of the invention in general terms, reference will now be made the accompanying drawings, wherein:

FIG. 1 illustrates technical components of a system for dynamically orchestrating API calls using quantum computing, in accordance with an embodiment of the invention;

FIG. 2 illustrates a process flow for API call filtering and API call routing in a system for dynamically orchestrating API calls using quantum computing, in accordance with an embodiment of the invention;

FIG. 3 illustrates a process flow and graph for optimizing time-to-live in a system for dynamically orchestrating API calls using quantum computing, in accordance with an embodiment of the invention;

FIG. 4 illustrates a schematic diagram of an exemplary quantum optimizer, in accordance with an embodiment of the invention;

FIG. 5 illustrates a process flow for quantum computing, in accordance with an embodiment of the invention;

FIG. 6 illustrates a process flow for API call traffic orchestration in a system for dynamically orchestrating API calls using quantum computing, in accordance with an embodiment of the invention;

FIG. 7 illustrates a diagram of an architecture for a system for dynamically orchestrating API calls using quantum computing, in accordance with an embodiment of the invention;

FIG. 8 illustrates a process flow for a system for dynamically orchestrating API calls using quantum computing, in accordance with an embodiment of the invention;

FIG. 9 illustrates a process flow for a system for dynamically orchestrating API calls using quantum computing, in accordance with an embodiment of the invention; and FIG. 10 illustrates a process flow for dynamically orchestrating API calls using quantum computing, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an API is a computing interface that defines interactions between software intermediaries. An API may define the types of calls and/or requests that may be made, how to make the calls and/or requests, data formats that may be used, conventions to follow, and/or the like. An API gateway may take API calls from clients and route the API calls to an appropriate channel, such as an endpoint or a cache. API gateways attempt to manage API call volume traffic to reduce the number of API calls made to an endpoint and to improve the latency of requests to the API. However, API gateways typically store data in the cache for a predefined time period which may be too long or too short depending on API call volume and API call context. By storing data in the cache for a longer time period than is necessary, the API gateways consume significant resources (e.g., financial resources, computing resources, network resources, and/or the like) associated with maintaining the cache and may increase latency, thereby reducing performance of the API. Additionally, storing data in the cache for a shorter time period than is necessary consumes significant resources (e.g., financial resources, computing resources, network resources, and/or the like) associated with maintaining the cache, increases the number of API calls made to the endpoint, and may increase latency, thereby reducing performance of the API.

Some embodiments described herein provide a system, a computer program product, and/or a method for dynamically orchestrating API calls using quantum computing. For example, a system (e.g., an electronic system for dynamically orchestrating API calls using quantum computing and/or the like) may be configured to use deep learning methods leveraging quantum computing to filter API call volume traffic and orchestrate flow in such a way that reduces the number of calls made to an endpoint and improves the latency of requests to the API. The system may monitor API call traffic and develop a contextual pattern using deep learning. In some embodiments, contextual understanding may include combining API calls and/or filtering API call traffic based on a likelihood of an API call being an attempt to misappropriate information from and/or disrupt the system. The system may include an orchestration engine that may route API calls to a cache or to an endpoint intelligently. For example, an intelligent auto rule engine may generate API call volume filtering rules and/or API call combination rules based on contextual understanding of API calls for a respective client. In some embodiments, the system may include a caching rule engine that may sync with the auto rule engine to orchestrate flow in such a way that reduces the number of calls made to the endpoint, thereby improving the latency of requests to the API. Additionally, or alternatively, the system may dynamically determine a time-to-live for maintaining data in a cache based on contextual information from traffic data.

By dynamically orchestrating the flow of the API calls to either the cache or the endpoint, the system reduces the number of API calls made to the endpoint, which conserves significant resources (e.g., financial resources, computing resources, network resources, and/or the like) and improves latency. By dynamically determining the time-to-live, the system dynamically optimizes the time period for which data is stored in the cache based on API call traffic, which conserves significant resources (e.g., financial resources, computing resources, network resources, and/or the like), reduces the number of API calls made to the endpoint, and improves latency.

In some embodiments, the system may perform intelligent dynamic contextual filtering of API call volume traffic and orchestrate flow to reduce the number of calls made to and endpoint. Additionally, or alternatively, the system may apply deep learning quantum methods to get generate contextual rules that optimize traffic intelligently. In some embodiments, the system may perform intelligent dynamic caching based on a contextual feed to reduce latency. Additionally, or alternatively, the system may include an intelligent two-way call filtering mechanism to reduce load on a server. In some embodiments, the system may perform real-time and/or near-real-time dynamic contextual API call traffic monitoring and/or orchestration using an intelligent auto rule engine. Additionally, or alternatively, the system may leverage quantum deep learning to derive rules for filtering call traffic and/or syncing a feed to a caching operation.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution" and/or an "allocation" may refer to any transaction, activities, and/or communication between one or more entities, between a user and one or more entities, and/or the like. A resource distribution and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for dynamically orchestrating API calls using quantum computing within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology.

In some embodiments, the system 130 and the user input system 140 may be used to implement processes described herein, including user-side and server-side processes for dynamically orchestrating API calls using quantum computing, in accordance with an embodiment of the present invention. The system 130 may represent various forms of digital computers, such as laptops, desktops, workstations, personal digital assistants, servers, blade servers, mainframes, and/or the like. The user input system 140 may represent various forms of mobile devices, such as personal digital assistants, cellular telephones, smartphones, smart glasses, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130 may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In one implementation, the memory 104 may be a volatile memory unit or units, such as volatile random-access memory (RAM) having a cache area for the temporary storage of information. In another implementation, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment may 100 include one or more user input systems and/or one or more API gateway router systems (e.g., similar to the system 130 and/or the user input system 140) associated with an entity (e.g., a business, a merchant, a financial institution, a card management institution, an software and/or hardware development company, a software and/or hardware testing company, and/or the like). For example, a user (e.g., an employee, a customer, and/or the like) may use a user input system (e.g., similar to the user input system 140) to initiate a change and/or a modification to one or more of the systems, applications, services, and/or the like (e.g., similar to the system 130, running a system similar to the system 130, and/or the like). In some embodiments, the user input system and/or the API gateway router systems associated with the entity may perform one or more of the steps described herein with respect to the process flows described herein with respect to FIGS. 2-8.

FIG. 2 illustrates a process flow 200 for API call filtering and API call routing in a system for dynamically orchestrating API calls using quantum computing within a technical environment, in accordance with an embodiment of the invention. In some embodiments, an API gateway router system and/or the like (e.g., similar to one or more of the systems described herein with respect to FIG. 1) may perform one or more of the steps of process flow 200.

As shown in FIG. 2, the process flow 200 may include a plurality of clients (e.g., Z clients), intelligent API filtering, intelligent API routing, a cache, an endpoint database, an API gateway router, and a caching rule engine. The process flow 200 may include the clients (e.g., client devices and/or systems, user devices and/or systems, and/or the like) providing API calls (e.g., calls, requests, and/or the like) to the API gateway router system.

As shown in FIG. 2, the process flow 200 may include receiving the API calls and using the intelligent API filtering (labelled 1 in FIG. 2) to filter the API calls from the clients to identify suspicious API calls and acceptable API calls. In some embodiments, the process flow 200 may include determining context for an API call. For example, the intelligent API filter may determine, for an API call, a client that transmitted the API call, that the client's geographic location is changing, that the client is requesting a copy operation every 30 seconds in sequential order, and that the client has a different IP address each time the client transmits an API call. In some embodiments, the process flow 200 may include flagging, based on the context of the API call, the client and/or the API call as suspicious or flagging the client and/or the API call as acceptable.

As shown in FIG. 2, the process flow 200 may include filtering the suspicious API calls and providing only the acceptable API calls to the intelligent API routing (labelled 2 in FIG. 2). By providing only the acceptable API calls, the system and/or the process flow 200 may conserve resources (e.g., financial resources, computing resources, network resources, and/or the like) that would otherwise be consumed by processing all of the API calls from the clients, correcting and/or mitigating damage done by the suspicious API calls. Furthermore, providing only the acceptable API calls, the system and/or the process flow 200 reduces the number of API calls sent to the endpoint, which also conserve resources and improves latency.

As shown in FIG. 2, the process flow 200 may include determining, using the intelligent API routing, whether to route API calls to the endpoint database or the cache, which may store one or more previously obtained endpoint responses to API calls. The process flow 200 may include routing the API calls to the endpoint database or the cache, and the endpoint database or the cache providing response to the API calls to the clients.

As shown in FIG. 2, the intelligent API filtering, the API gateway router, and the caching rule engine may sync and/or share information (e.g., the contextual information, the API calls, client information, traffic data, and/or the like) associated with the clients, the API calls, the cache, the endpoint database, the API gateway router, the caching rule engine, and/or the like to improve the filtering and/or routing of the API calls.

In some embodiments, an API gateway may receive AP calls from clients, and route them to an appropriate channel, such as an endpoint or a cache, based on an intelligent decision. For example, an e-commerce site may use an API gateway to provide mobile clients with an endpoint for retrieving all product details with a single request and invoke various services, such as product information and reviews, and combine the results.

In some embodiments, the process flow 200 may include enabling API caching in an API gateway to cache responses of an endpoint. Additionally, or alternatively, intelligent caching may reduce the number of API calls made to the endpoint and improve latency of requests to the API.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates a process flow 300 and a graph 350 for optimizing time-to-live in a system for dynamically orchestrating API calls using quantum computing, in accordance with an embodiment of the invention. In some embodiments, an API gateway router system and/or the like (e.g., similar to one or more of the systems described herein with respect to FIG. 1) may perform one or more of the steps of process flow 300. As shown in FIG. 3, the process flow 300 may include using quantum annealing to determine an optimal time-to-live for data stored in a cache for responding to API calls. In some embodiments, a time-to-live (e.g., a hop limit and/or the like) may be a mechanism that limits the lifespan and/or lifetime of data in a computer and/or a network. Time-to-live may be implemented as a counter and/or a timestamp attached to and/or embedded in data. After a predetermined event count and/or timespan has elapsed, the data may be discarded and/or revalidated. Additionally, or alternatively, a time-to-live may be a period of time, an event count, a number of times data is accessed, and/or the like.

As shown in FIG. 3, the process flow 300 may include receiving API calls, determining which API calls are acceptable API calls (e.g., using intelligent API filtering and/or the like), determining configurations of the acceptable API calls using quantum annealing, determining whether to route the acceptable API calls to a cache or an endpoint, and determining an optimal cache time and/or time-to-live for the acceptable API calls routed to the cache. In FIG. 3, "N" represents the number of clients, "n" represents the number of API calls, "M" represents the number of acceptable API calls, and "L" represents the number of API call configurations (e.g., acceptable API calls whose information may be combined and/or the like). Additionally, or alternatively, "X" may represent the number of call monitoring features. In some embodiments, the process flow 300 may include using quantum annealing to determine an optimal time-to-live for the acceptable API calls routed to the cache based on N, n, X, two routing mechanisms (e.g., cache and endpoint), M, and L, where the goals of the quantum annealing are to minimize unacceptable calls routed to the cache and the endpoint, minimize the number of calls routed to the endpoint, and/or optimize the time-to-live. As shown in FIG. 3, the cache time and/or time-to-live may be a function of the number of API call configurations (L).

As shown by the graph 350 in FIG. 3, the process flow 300 may include determining the optimal cache time and/or time-to-live for the acceptable API calls as a function of time. In some embodiments, the process flow 300 may include dynamically determining (e.g., using the quantum annealing) the optimal cache time and/or time-to-live for the acceptable API calls as the acceptable API calls are received over time. For example, as the acceptable API calls are received over time, the configurations (L) of the acceptable API calls may change, and the process flow 300 may include determining and changing the optimal cache time and/or time-to-live as the configurations change. In the graph 350 of FIG. 3, a lower time-to-live may correspond to a time period during which more of the acceptable API calls are being routed to the endpoint than to the cache, and a higher time-to-live may correspond to a time period during which more of the acceptable API calls are being routed to the cache than the endpoint. In this way, the process flow 300 may (e.g., using an API gateway) cache responses from the endpoint for the determined time-to-live, and optimize the determined time-to-live to improve performance, conserve resources, and reduce costs associated with maintaining the cache.

Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

As noted, the systems and/or methods described herein may use quantum computing and/or quantum annealing. In some embodiments, the systems and/or methods may use a quantum approximate optimization algorithm, which is a quantum algorithm for finding approximate solutions to optimization problems. Additionally, or alternatively, the quantum approximate optimization algorithm may be a discretization of the quantum adiabatic algorithm (QAA or QADI), which uses adiabatic quantum computing to solve optimization problems. In some embodiments, quantum annealing may be a metaheuristic for finding the global minimum of a given objective function over a given set of candidate solutions (candidate states), by a process using quantum fluctuations (in other words, a meta-procedure for finding a procedure that finds an absolute minimum size/length/cost/distance from within a possibly very large, but nonetheless finite set of possible solutions using quantum fluctuation-based computation instead of classical computation).

FIG. 4 illustrates a schematic diagram of an exemplary Quantum Optimizer 400, in accordance with an embodiment of the invention. In some embodiments, an API gateway router system and/or the like (e.g., similar to one or more of the systems described herein with respect to FIG. 1) may include the Quantum Optimizer 400. In some embodiments, the Quantum Optimizer 400 may be used in parallel with a classical computer to solve optimization problems. The Quantum Optimizer 400 includes of a Data Extraction Subsystem 404, a Quantum Computing Subsystem 401, and an Action Subsystem 405. As used herein, the term "subsystem" generally refers to components, modules, hardware, software, communication links, and/or the like of particular components of the system. Subsystems as contemplated in embodiments of the present invention are configured to perform tasks within the system as a whole. In some embodiments, the systems described herein may include the Quantum Optimizer 400. Additionally, or alternatively, the methods described herein may include using the Quantum Optimizer 400. In some embodiments, the Quantum Optimizer 400 may be a component of a system operated, maintained, and/or the like by an entity other than the entity that operates, maintains, and/or the like the other systems described herein.

As depicted in FIG. 4, the Data Extraction Subsystem 404 communicates with the network to extract data for optimization. It will be understood that any method of communication between the Data Extraction Subsystem 404 and the network may be used, including but not limited to wired communication, Radiofrequency (RF) communication, Bluetooth Wi-Fi, and the like. The Data Extraction Subsystem 404 then formats the data for optimization in the Quantum Computing Subsystem.

As further depicted in FIG. 4, the Quantum Computing Subsystem 401 may include a Quantum Computing Infrastructure 423, a Quantum Memory 422, and a Quantum Processor 421. The Quantum Computing Infrastructure 423 may include physical components for housing the Quantum Processor 421 and the Quantum Memory 422. The Quantum Computer Infrastructure 423 may also include a cryogenic refrigeration system to maintain a desired operating environment for the Quantum Computing Subsystem 401. In general, the Quantum Processor 421 is designed to perform adiabatic quantum computation and/or quantum annealing to optimize data received from the Data Extraction Subsystem 404. The Quantum Memory 422 may include a plurality of qubits used for storing data during operation of the Quantum Computing Subsystem 401. In general, qubits are any two-state quantum mechanical system. It will be understood that the Quantum Memory 422 may include any such two-state quantum mechanical system, such as the polarization of a single photon, the spin of an electron, and the like.

The Action Subsystem 402 communicates the optimized data from the Quantum Computing Subsystem 401 over the network. It will be understood that any method of communication between the Action Subsystem 402 and the network may be used, including but not limited to wired communication, Radiofrequency (RF) communication, Bluetooth Wi-Fi, and the like.

FIG. 5 illustrates a process flow 500 for quantum computing, in accordance with an embodiment of the invention. In some embodiments, an API gateway router system and/or the like (e.g., similar to one or more of the systems described herein with respect to FIG. 1) may perform one or more of the steps of process flow 500. As depicted in FIG. 5, a classical computer begins the process at step 501 by collecting data from a plurality of inputs. At step 502, the classical computer then determines from the set of data collected at step 501 a subset a data to be optimized. The classical computer then formats the subset of data for optimization at step 503. At step 504, the classical computer transmits the formatted subset of data to the Quantum Optimizer. The Quantum Optimizer runs the data to obtain the optimized solution at 505. The Quantum Optimizer then transmits the optimized data back to the classical computer at step 506. Finally, the classical computer can perform actions based on receiving the optimized solution at step 507. In some embodiments, the systems described herein may perform one or more steps of process flow 500. Additionally, or alternatively, the methods described herein may include one or more steps of process flow 500.

Process flow 500 may include additional embodiments, such as any single embodiment or any combination of embodiments described below and/or in connection with one or more other processes described elsewhere herein. Although FIG. 5 shows example blocks of process flow 500, in some embodiments, process flow 500 may include additional blocks, fewer blocks, different blocks, or differently arranged blocks than those depicted in FIG. 5. Additionally, or alternatively, two or more of the blocks of process flow 500 may be performed in parallel.

FIG. 6 illustrates a process flow 600 for API call traffic orchestration in a system for dynamically orchestrating API calls using quantum computing, in accordance with an embodiment of the invention. In some embodiments, an API gateway router system and/or the like (e.g., similar to one or more of the systems described herein with respect to FIG. 1) may perform one or more of the steps of process flow 600. As shown in FIG. 6, the process flow 600 may include a plurality of clients (e.g., users, devices, systems, and/or the like), an API gateway router, quantum annealing, a cache, a platform, and an endpoint. In some embodiments, and as shown in FIG. 6, the endpoint may include one or more databases, and the API gateway router may include an API call monitoring engine, a deep learning quantum engine, an intelligent auto rule generator, a caching rule engine, and an API call traffic orchestrator.

As shown in FIG. 6, the process flow 600 may include receiving, with the API gateway router, API calls from the clients and monitoring the API call traffic with the API call monitoring engine. In some embodiments, the process flow 600 may include generating, with the API call monitoring engine, traffic data based on the monitoring and providing the traffic data to the deep learning quantum engine. Additionally, or alternatively, and as shown in FIG. 6, the deep learning quantum engine may perform quantum annealing and may use a long short-term memory neural network, natural language processing, natural language understanding, and natural language generation.

As shown in FIG. 6, the process flow 600 may include generating, using the deep learning quantum engine, the intelligent auto rule generator, and/or the caching rule engine, one or more rules for routing API calls, one or more rules for caching data from the endpoint, and/or the like. In some embodiments, the process flow 600 may include applying the routing rules and/or the caching rules to the API call traffic using the API call traffic orchestrator. For example, the process flow 600 may include routing API calls to the cache such that the cache provides responses to the API calls to the clients. As another example, the process flow 600 may include routing API calls to the platform which may access one or more databases to provide responses to the API calls to the clients.

Process flow 600 may include additional embodiments, such as any single embodiment or any combination of embodiments described below and/or in connection with one or more other processes described elsewhere herein. Although FIG. 6 shows example blocks of process flow 600, in some embodiments, process flow 600 may include additional blocks, fewer blocks, different blocks, or differently arranged blocks than those depicted in FIG. 6. Additionally, or alternatively, two or more of the blocks of process flow 600 may be performed in parallel.

FIG. 7 illustrates a diagram of an architecture 700 for a system for dynamically orchestrating API calls using quantum computing, in accordance with an embodiment of the invention. In some embodiments, an API gateway router system and/or the like (e.g., similar to one or more of the systems described herein with respect to FIG. 1) may include the architecture 700. As shown in FIG. 7, the architecture 700 may include an API call traffic gateway and a platform and database.

In some embodiments, and as shown in FIG. 7, the API call traffic gateway may receive API client calls from a plurality of clients and may include an API call monitoring engine for monitoring the API client calls and generating traffic data (e.g., call volume from clients, including whether the calls are get, post, put, patch, and/or delete calls, IP addresses associated with the API calls, geographic locations of the clients, device properties of the clients, and/or the like) and a deep learning quantum engine. The deep learning quantum engine may identify, based on the traffic data, contextual information regarding the API client calls.

As shown in FIG. 7, the API call traffic gateway may include an intelligent auto rule generator for receiving the contextual information from the deep learning quantum engine and generating rules for combining API calls, rules for routing API calls, and/or the like. The intelligent auto rule generator may exchange data with a caching rule engine to determine rules for caching endpoint responses to API calls. Additionally, or alternatively, the intelligent auto rule generator may provide data, rules, and/or the like to an API call traffic orchestrator.

As shown in FIG. 7, the API call traffic orchestrator may determine, based on data rules, and/or the like from the intelligent auto rule generator, whether to route the API calls to the cache or to the endpoint (e.g., an application, platform, and/or database at the endpoint). As also shown in FIG. 7, depending on whether an API call from a client is routed to the cache or the endpoint, the cache may provide a stored endpoint response to the client in response to the API call or the endpoint may provide a response to the client in response to the API call.

Although FIG. 7 shows example components of the architecture 700, in some embodiments, the architecture 700 may include additional components, fewer components, different components, or differently arranged components than those depicted in FIG. 7. Additionally, or alternatively, two or more of the components of the architecture 700 may be provided by more than one entity and/or system.

FIG. 8 illustrates a process flow 800 for a system for dynamically orchestrating API calls using quantum computing, in accordance with an embodiment of the invention. In some embodiments, an API gateway router system and/or the like (e.g., similar to one or more of the systems described herein with respect to FIG. 1) may perform one or more of the steps of process flow 800. As shown in FIG. 8, the process flow 800 may include clients generating API calls (e.g., Call 1, Call 2, Call 3, etc.), an API call monitoring engine, a deep learning quantum engine, an intelligent auto rule generator, a caching rule engine, an API call traffic orchestrator, a cache, and an endpoint.

In some embodiments, and as shown in FIG. 8, the process flow 800 may include monitoring, with the API call monitoring engine, the API calls and generating, with the API call monitoring engine, traffic data (e.g., call volume from clients, including whether the calls are get, post, put, patch, and/or delete calls, IP addresses associated with the API calls, geographic locations of the clients, device properties of the clients, and/or the like). The process flow 800 may include providing the traffic data to the deep learning quantum engine and identifying, based on the traffic data, contextual information regarding the API client calls. For example, the contextual information may include types of API calls made by a client, a pattern of API calls from a client, timing of API calls from a client, changes to a geographic location of a client, changes to an IP address of a client, and/or the like. The process flow 800 may include generating, based on the contextual information and using the intelligent auto rule generator, rules for combining API calls, rules for routing API calls, and/or the like.

As shown in FIG. 8, the process flow 800 may include dynamically updating caching rules generated and/or applied by the caching rule engine based on the rules for combining API calls, rules for routing API calls, and/or the like from the intelligent auto rule generator. For example, the process flow 800 may include changing, based on determining that one or more API calls should be routed to the cache or the endpoint, the time-to-live (e.g., cache time). In some embodiments, the process flow 800 may include providing, with the intelligent auto rule generator, the rules for combining API calls, rules for routing API calls, and/or the like to the API call traffic orchestrator and routing, with the API call traffic orchestrator, based on the rules for combining API calls, the rules for routing API calls, and/or the like, the API calls to the cache (route A) or the endpoint (route B). As shown in FIG. 8, the cache and the endpoint may provide response to the API calls to the clients.

Process flow 800 may include additional embodiments, such as any single embodiment or any combination of embodiments described below and/or in connection with one or more other processes described elsewhere herein. Although FIG. 8 shows example blocks of process flow 800, in some embodiments, process flow 800 may include additional blocks, fewer blocks, different blocks, or differently arranged blocks than those depicted in FIG. 8. Additionally, or alternatively, two or more of the blocks of process flow 800 may be performed in parallel.

FIG. 9 illustrates a process flow 900 for a system for dynamically orchestrating API calls using quantum computing, in accordance with an embodiment of the invention. In some embodiments, an API gateway router system and/or the like (e.g., similar to one or more of the systems described herein with respect to FIG. 1) may perform one or more of the steps of process flow 900. As shown in FIG. 9, the process flow 900 may include a deep learning quantum engine, an intelligent auto rule generator, an API call orchestration engine, and endpoint and a cache. In some embodiments, the intelligent auto rule generator may include a safety filtering mechanism and a grouping mechanism.

In some embodiments, clients may generate API calls (e.g., client requests), and the process flow 900 may include prioritizing, with the deep learning quantum engine, the API calls. For example, the deep learning quantum engine may use natural language processing, natural language understanding, and/or natural language generation to analyze the API calls and/or traffic data from the API calls to develop a contextual understanding of the API calls and prioritize the API calls based on the contextual understanding. In some embodiments, the process flow 900 may include clustering, with the deep learning quantum engine, the client requests and/or the API calls.

As shown in FIG. 9, the process flow 900 may include filtering, with the safety filtering mechanism, the API calls based on the contextual understanding and an associated likelihood of an API call being an attempt to misappropriate information from and/or disrupt the system. In some embodiments, the safety filtering mechanism may include artificial intelligence, a machine learning model, and/or the like trained to determine a likelihood that an API call and/or a group of API calls is associated with an attempt to misappropriate information from and/or disrupt the system and/or whether the likelihood satisfies a threshold. Based on the likelihood satisfying the threshold, the safety filtering mechanism may flag the API call and/or the group of API calls as suspicious and prevent the API call and/or the group of API calls from reaching the cache or the endpoint. In some embodiments, the process flow 900 may include providing only API calls that have not been flagged as suspicious to the grouping mechanism.

As shown in FIG. 9, the process flow 900 may include grouping, with the grouping mechanism, API calls. In some embodiments, the grouping mechanism may include artificial intelligence, a machine learning model, and/or the like trained to determine whether a pair and/or a group of API calls may be grouped together for handling by the endpoint and/or the cache. Additionally, or alternatively, the process flow 900 may include grouping, based on determining that a pair and/or a group of API calls may be grouped together, the pair and/or the group of API calls for further handling. The process flow 900 may include providing the grouped API calls to the API call orchestration engine.

As shown in FIG. 9, the process flow 900 may include routing, with the API call orchestration engine, the grouped API calls to either the endpoint or the cache. For example, the process flow 900 may include routing the grouped API calls to either the endpoint or the cache based on rules generated by the intelligent auto rule generator.

As shown in FIG. 9, the process flow 900 may include providing, from the endpoint and/or the cache, feedback data to the deep learning quantum engine. In some embodiments, the process flow 900 may include analyzing the feedback data with the deep learning quantum engine to generate additional and/or improved rules for filtering, grouping, and/or routing API calls.

Process flow 900 may include additional embodiments, such as any single embodiment or any combination of embodiments described below and/or in connection with one or more other processes described elsewhere herein. Although FIG. 9 shows example blocks of process flow 900, in some embodiments, process flow 900 may include additional blocks, fewer blocks, different blocks, or differently arranged blocks than those depicted in FIG. 9. Additionally, or alternatively, two or more of the blocks of process flow 900 may be performed in parallel.

FIG. 10 illustrates a process flow 1000 for dynamically orchestrating API calls using quantum computing, in accordance with an embodiment of the invention. In some embodiments, an API gateway router system and/or the like (e.g., similar to one or more of the systems described herein with respect to FIG. 1) may perform one or more of the steps of process flow 1000.

As shown in block 1002, the process flow 1000 may include receiving API calls from clients. For example, an API gateway router system may receive multiple API calls from multiple clients. In some embodiments, the API calls may include requests to get, post, put, patch, and/or delete data, information, and/or the like from endpoint, such as an application, system, platform, database, data structure, and/or the like.

As shown in block 1004, the process flow 1000 may include determining, using a first machine learning model, whether each API call of the API calls is acceptable to obtain acceptable API calls. For example, an API gateway router may determine, using a first machine learning model, whether each API call of the API calls is acceptable to obtain acceptable API calls. In some embodiments, the first machine learning model may be trained using historical data associated with API calls, processed API calls, outcomes of processing API calls, and/or the like. Additionally, or alternatively, the first machine learning model may be trained using a first quantum computing engine.

In some embodiments, the first machine learning model may determine whether an API call is acceptable by determining, based on data associated with the API call (e.g., traffic data, contextual information, and/or the like), a likelihood that the API call and/or a group of API calls of which the API call is a member is associated with an attempt to misappropriate information from and/or disrupt the system. Additionally, or alternatively, the first machine learning model may determine whether the likelihood satisfies a threshold. Based on the likelihood satisfying the threshold, the first machine learning model may determine that the API call is not acceptable. In some embodiments, the process flow 1000 may include preventing, based on determining that the API call is not acceptable, the API call from reaching a cache or an endpoint.

As shown in block 1006, the process flow 1000 may include determining, using a second machine learning model, whether each acceptable API call of the acceptable API calls is combinable with another acceptable API call of the acceptable API calls to obtain API call categories. For example, an API gateway router may determine, using a second machine learning model, whether each acceptable API call of the acceptable API calls is combinable with another acceptable API call of the acceptable API calls to obtain API call categories. In some embodiments, each API call category of the API call categories may include combinable API calls. Additionally, or alternatively, the second machine learning model may be trained using historical data associated with API calls, processed API calls, outcomes of processing API calls, and/or the like. In some embodiments, the second machine learning model may be trained using a second quantum computing engine.

As shown in block 1008, the process flow 1000 may include determining, using a third machine learning model, whether to route each API call category of the API call categories to a cache or to an endpoint. For example, an API gateway router may determine, using a third machine learning model, whether to route each API call category of the API call categories to a cache or to an endpoint. In some embodiments, the third machine learning model may be trained using historical data associated with API calls, processed API calls, outcomes of processing API calls, and/or the like. Additionally, or alternatively, the third machine learning model may be trained using a third quantum computing engine.

As shown in block 1010, the process flow 1000 may include obtaining, based on determining to route an API call category of the API call categories to the cache, data from the endpoint. For example, an API gateway router may obtain, based on determining to route an API call category of the API call categories to the cache, data from the endpoint. In some embodiments, the data may include responses of the endpoint to the acceptable API calls of the API call category.

As shown in block 1012, the process flow 1000 may include determining, based on determining to route the API call category to the cache and using a fourth machine learning model, a time-to-live for maintaining the data in the cache for the API call category. For example, an API gateway router may determine, based on determining to route the API call category to the cache and using a fourth machine learning model, a time-to-live for maintaining the data in the cache for the API call category. In some embodiments, the fourth machine learning model may be trained using a fourth quantum computing engine.

As shown in block 1014, the process flow 1000 may include providing, based on the data in the cache, responses to the acceptable API calls of the API call category. For example, an API gateway router may provide, based on the data in the cache, responses to the acceptable API calls of the API call category.

Process flow 1000 may include additional embodiments, such as any single embodiment or any combination of embodiments described below and/or in connection with one or more other processes described elsewhere herein.

In a first embodiment, the process flow 1000 may include monitoring the received API calls and the responses to the acceptable API calls to generate traffic data.

In a second embodiment alone or in combination with the first embodiment, the process flow 1000 may include training at least one of the first machine learning model, the second machine learning model, the third machine learning model, or the fourth machine learning model based on the traffic data.

In a third embodiment alone or in combination with any of the first through second embodiments, the process flow 300 may include, when determining whether each API call of the API calls is acceptable, processing, using a natural language processing engine, each API call of the API calls to obtain contextual information associated with each API call and determining, using the first machine learning model and based on the contextual information, whether each API call of the API calls is acceptable.

In a fourth embodiment alone or in combination with any of the first through third embodiments, the contextual information may include, for each API call, at least one of a call volume associated with a client requesting the API call, a type of the API call, an internet protocol address associated with the API call, a geographic location associated with the API call, or a property of a device transmitting the API call.

In a fifth embodiment alone or in combination with any of the first through fourth embodiments, the process flow 1000 may include, when determining whether each API call of the API calls is acceptable, determining, based on filter rules generated by the first machine learning model, whether each API call of the API calls is acceptable.

In a sixth embodiment alone or in combination with any of the first through fifth embodiments, the process flow 1000 may include, when determining whether each acceptable API call of the acceptable API calls is combinable with another acceptable API call of the acceptable API calls, determining, based on combination rules generated by the second machine learning model, whether each acceptable API call of the acceptable API calls is combinable with another acceptable API call of the acceptable API calls.

In a seventh embodiment alone or in combination with any of the first through sixth embodiments, the process flow 1000 may include, when determining whether to route each API call category of the API call categories to the cache or to the endpoint, determining, based on cache rules generated by the third machine learning model, whether to route each API call category of the API call categories to the cache or to the endpoint.

In an eighth embodiment alone or in combination with any of the first through seventh embodiments, the process flow 1000 may include providing, based on determining to route another API call category, of the API call categories, to the endpoint, a set of acceptable API calls of the other API call category to the endpoint.

In a ninth embodiment alone or in combination with any of the first through eighth embodiments, the process flow 300 may include determining to route the other API call category to the endpoint based on determining that the other API call category comprises API calls requesting dynamic data.

In a tenth embodiment alone or in combination with any of the first through ninth embodiments, the process flow 1000 may include maintaining the data in the cache for the time-to-live.

In an eleventh embodiment alone or in combination with any of the first through tenth embodiments, the process flow 1000 may include determining whether the time-to-live has expired, determining whether the data in the cache is being used, and deleting, based on determining that the time-tolive has expired and based on determining that the data in the cache is not being used, the data from the cache.

In a twelfth embodiment alone or in combination with any of the first through eleventh embodiments, the endpoint may include one or more servers hosting at least one of systems or data structures.

In a thirteenth embodiment alone or in combination with any of the first through twelfth embodiments, the first quantum computing engine, the second quantum computing engine, and/or the third quantum computing engine may be configured to train the first machine learning model, the second machine learning model, and/or the third machine learning model, respectively, to reduce a volume of API calls routed to the endpoint Although FIG. 10 shows example blocks of process flow 1000, in some embodiments, process flow 1000 may include additional blocks, fewer blocks, different blocks, or differently arranged blocks than those depicted in FIG. 10. Additionally, or alternatively, two or more of the blocks of process flow 1000 may be performed in parallel.

As noted above, in some embodiments, the process flows described herein may include performing one or more of the functions described herein using machine learning and/or a machine learning model. For example, the system may provide API call traffic data and/or the like to a machine learning model trained (e.g., using historical data) to output determinations of whether API calls are acceptable, whether API calls are combinable, whether to route API calls to a cache or an endpoint, times-to-live, cache times, and/or the like.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on historical data associated with API call traffic data, responses of an API to API calls, and/or the like over a predetermined past period of time. In doing so, the system may be configured to generate determinations of whether API calls are acceptable, whether API calls are combinable, whether to route API calls to a cache or an endpoint, times-to-live, cache times, and/or the like. In some embodiments, the one or more machine learning algorithms may be used to calculate likelihoods, and whether the likelihoods satisfy a threshold. Additionally, or alternatively, the system may continuously re-train the machine learning model using a quantum computing engine, API call traffic data, and responses of the API to API calls.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for dynamically orchestrating application programming interface (API) calls using quantum computing, the system comprising:
   at least one non-transitory storage device; and
   at least one processing device coupled to the at least one non-transitory storage device, wherein the at least one processing device is configured to:
   receive API calls from clients;
   determine, using a first machine learning model, whether each API call of the API calls is acceptable to obtain acceptable API calls, wherein the first machine learning model is trained using a first quantum computing engine;
   determine, using a second machine learning model, whether each acceptable API call of the acceptable API calls is combinable with another acceptable API call of the acceptable API calls to obtain API call categories, wherein each API call category of the API call categories comprises combinable API calls, and wherein the second machine learning model is trained using a second quantum computing engine;
   determine, using a third machine learning model, whether to route each API call category of the API call categories to a cache or to an endpoint, wherein the third machine learning model is trained using a third quantum computing engine;
   obtain, based on determining to route an API call category of the API call categories to the cache, data from the endpoint, wherein the data comprises responses of the endpoint to the acceptable API calls of the API call category;

determine, based on determining to route the API call category to the cache and using a fourth machine learning model, a time-to-live for maintaining the data in the cache for the API call category, wherein the fourth machine learning model is trained using a fourth quantum computing engine; and provide, based on the data in the cache, responses to the acceptable API calls of the API call category.

2. The system of claim 1, wherein the at least one processing device is configured to monitor the received API calls and the responses to the acceptable API calls to generate traffic data.

3. The system of claim 2, wherein the at least one processing device is configured to train at least one of the first machine learning model, the second machine learning model, the third machine learning model, or the fourth machine learning model based on the traffic data.

4. The system of claim 1, wherein the at least one processing device is configured to, when determining whether each API call of the API calls is acceptable:

process, using a natural language processing engine, each API call of the API calls to obtain contextual information associated with each API call; and determine, using the first machine learning model and based on the contextual information, whether each API call of the API calls is acceptable.

5. The system of claim 4, wherein the contextual information comprises, for each API call, at least one of a call volume associated with a client requesting the API call, a type of the API call, an internet protocol address associated with the API call, a geographic location associated with the API call, or a property of a device transmitting the API call.

6. The system of claim 1, wherein the at least one processing device is configured to, when determining whether each API call of the API calls is acceptable, determine, based on filter rules generated by the first machine learning model, whether each API call of the API calls is acceptable.

7. The system of claim 1, wherein the at least one processing device is configured to, when determining whether each acceptable API call of the acceptable API calls is combinable with another acceptable API call of the acceptable API calls, determine, based on combination rules generated by the second machine learning model, whether each acceptable API call of the acceptable API calls is combinable with another acceptable API call of the acceptable API calls.

8. The system of claim 1, wherein the at least one processing device is configured to, when determining whether to route each API call category of the API call categories to the cache or to the endpoint, determine, based on cache rules generated by the third machine learning model, whether to route each API call category of the API call categories to the cache or to the endpoint.

9. The system of claim 1, wherein the at least one processing device is configured to provide, based on determining to route another API call category, of the API call categories, to the endpoint, a set of acceptable API calls of the other API call category to the endpoint.

10. The system of claim 9, wherein the at least one processing device is configured to determine to route the other API call category to the endpoint based on determining that the other API call category comprises API calls requesting dynamic data.

11. The system of claim 1, wherein the at least one processing device is configured to maintain the data in the cache for the time-to-live.

12. The system of claim 1, wherein the at least one processing device is configured to:

determine whether the time-to-live has expired;

determine whether the data in the cache is being used; and delete, based on determining that the time-to-live has expired and based on determining that the data in the cache is not being used, the data from the cache.

13. The system of claim 1, wherein the endpoint comprises one or more servers hosting at least one of systems or data structures.

14. The system of claim 1, wherein the first quantum computing engine, the second quantum computing engine, and the third quantum computing engine are configured to train the first machine learning model, the second machine learning model, and the third machine learning model, respectively, to reduce a volume of API calls routed to the endpoint.

15. A computer program product for dynamically orchestrating application programming interface (API) calls using quantum computing, the computer program product comprising a non-transitory computer-readable medium comprising code causing a first apparatus to:

receive API calls from clients;

determine, using a first machine learning model, whether each API call of the API calls is acceptable to obtain acceptable API calls, wherein the first machine learning model is trained using a first quantum computing engine;

determine, using a second machine learning model, whether each acceptable API call of the acceptable API calls is combinable with another acceptable API call of the acceptable API calls to obtain API call categories, wherein each API call category of the API call categories comprises combinable API calls, and wherein the second machine learning model is trained using a second quantum computing engine;

determine, using a third machine learning model, whether to route each API call category of the API call categories to a cache or to an endpoint, wherein the third machine learning model is trained using a third quantum computing engine;

obtain, based on determining to route an API call category of the API call categories to the cache, data from the endpoint, wherein the data comprises responses of the endpoint to the acceptable API calls of the API call category;

determine, based on determining to route the API call category to the cache and using a fourth machine learning model, a time-to-live for maintaining the data in the cache for the API call category, wherein the fourth machine learning model is trained using a fourth quantum computing engine; and provide, based on the data in the cache, responses to the acceptable API calls of the API call category.

16. The computer program product of claim 15, wherein the non-transitory computer-readable medium comprises code causing the first apparatus to monitor the received API calls and the responses to the acceptable API calls to generate traffic data.

17. The computer program product of claim 16, wherein the non-transitory computer-readable medium comprises code causing the first apparatus to train at least one of the first machine learning model, the second machine learning model, the third machine learning model, or the fourth machine learning model based on the traffic data.

18. The computer program product of claim 15, wherein the non-transitory computer-readable medium comprises code causing the first apparatus to, when determining whether each API call of the API calls is acceptable:

processing, using a natural language processing engine, each API call of the API calls to obtain contextual information associated with each API call; and determine, using the first machine learning model and based on the contextual information, whether each API call of the API calls is acceptable.

19. The computer program product of claim 18, wherein the contextual information comprises, for each API call, at least one of a call volume associated with a client requesting the API call, a type of the API call, an internet protocol address associated with the API call, a geographic location associated with the API call, or a property of a device transmitting the API call.

20. A method for dynamically orchestrating application programming interface (API) calls using quantum computing, the method comprising:

receiving API calls from clients;

determining, using a first machine learning model, whether each API call of the API calls is acceptable to obtain acceptable API calls, wherein the first machine learning model is trained using a first quantum computing engine;

determining, using a second machine learning model, whether each acceptable API call of the acceptable API calls is combinable with another acceptable API call of the acceptable API calls to obtain API call categories, wherein each API call category of the API call categories comprises combinable API calls, and wherein the second machine learning model is trained using a second quantum computing engine;

determining, using a third machine learning model, whether to route each API call category of the API call categories to a cache or to an endpoint, wherein the third machine learning model is trained using a third quantum computing engine;

obtaining, based on determining to route an API call category of the API call categories to the cache, data from the endpoint, wherein the data comprises responses of the endpoint to the acceptable API calls of the API call category;

determining, based on determining to route the API call category to the cache and using a fourth machine learning model, a time-to-live for maintaining the data in the cache for the API call category, wherein the fourth machine learning model is trained using a fourth quantum computing engine; and providing, based on the data in the cache, responses to the acceptable API calls of the API call category.

* * * * *